United States Patent Office 3,433,372
Patented Mar. 18, 1969

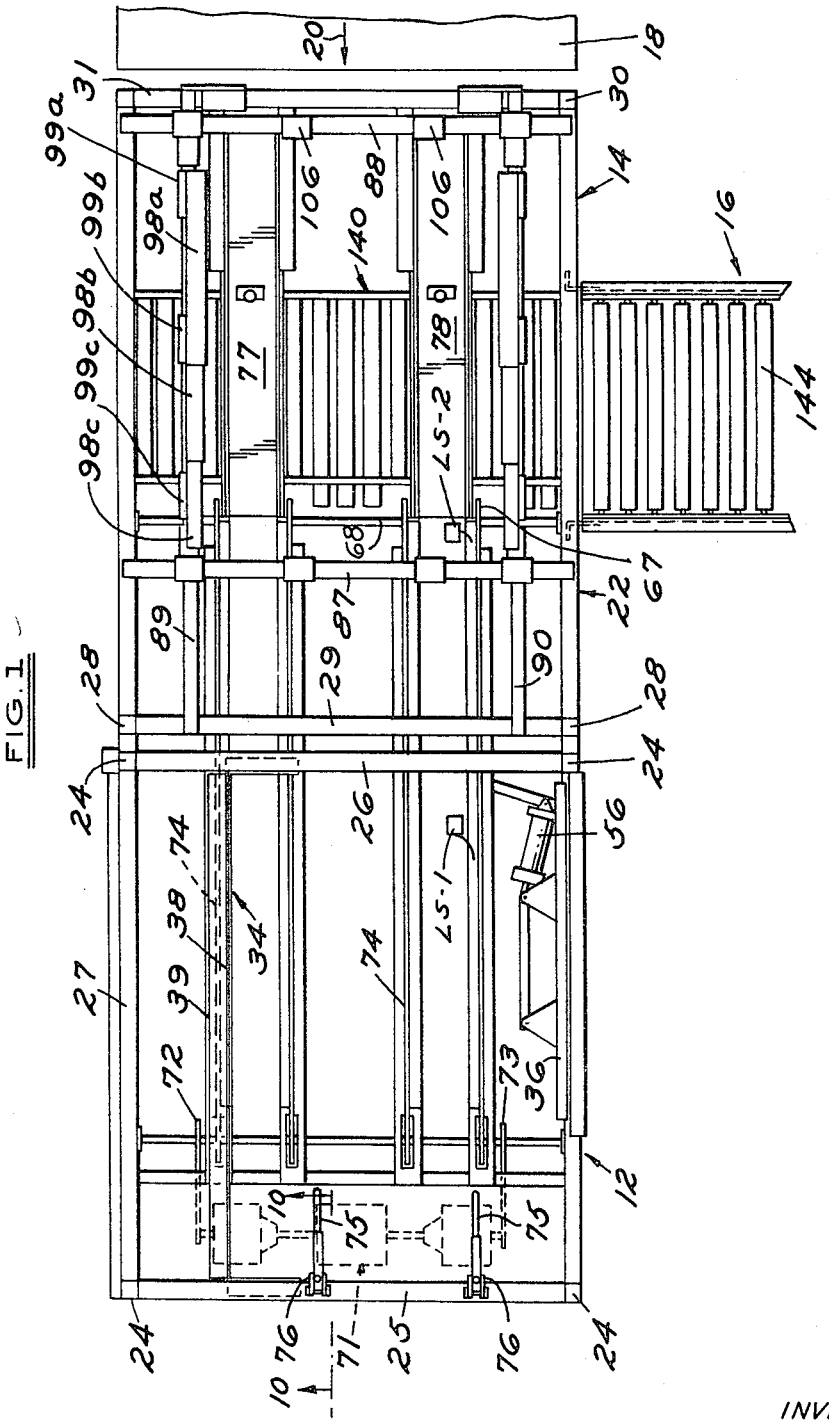

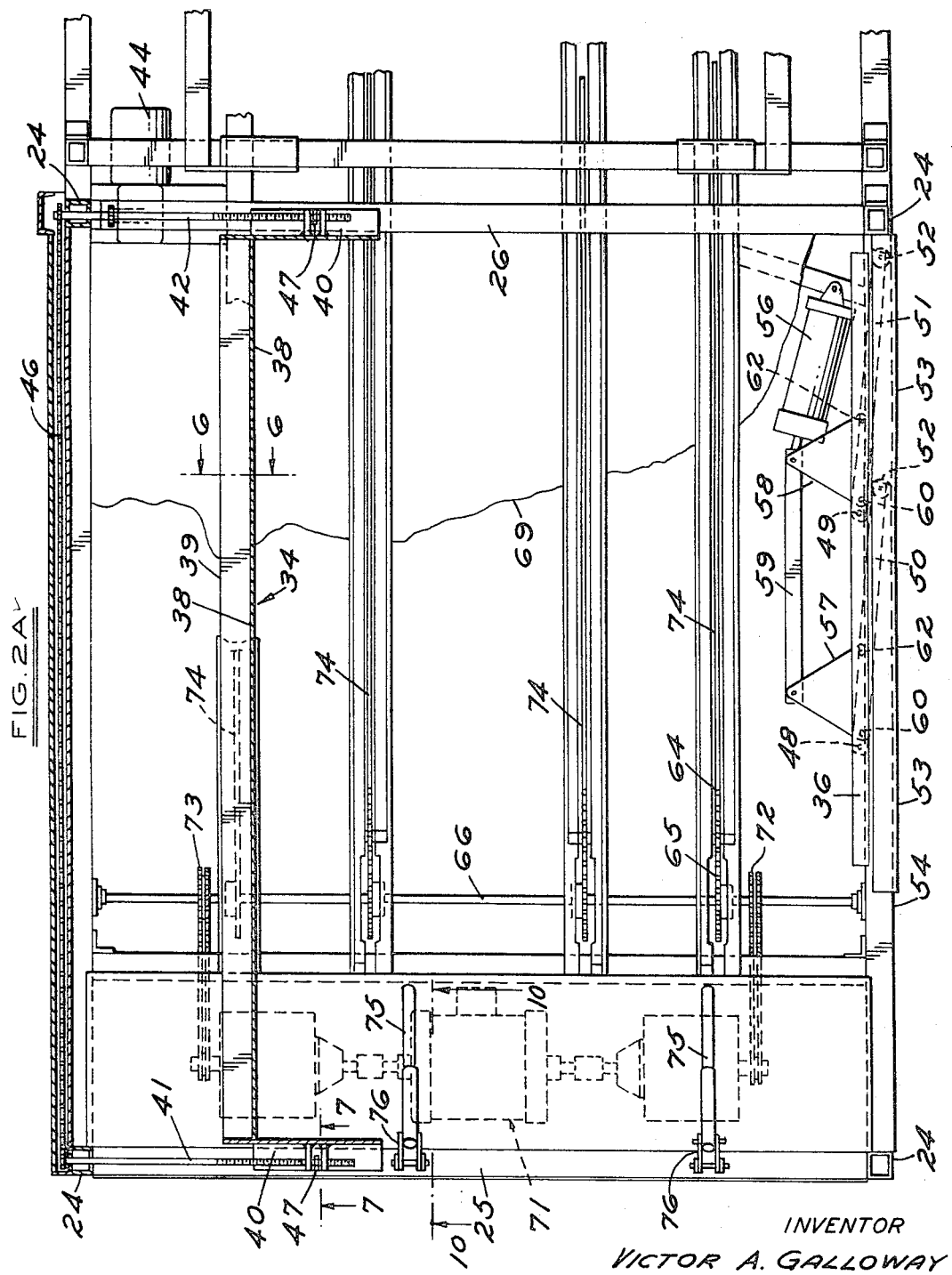

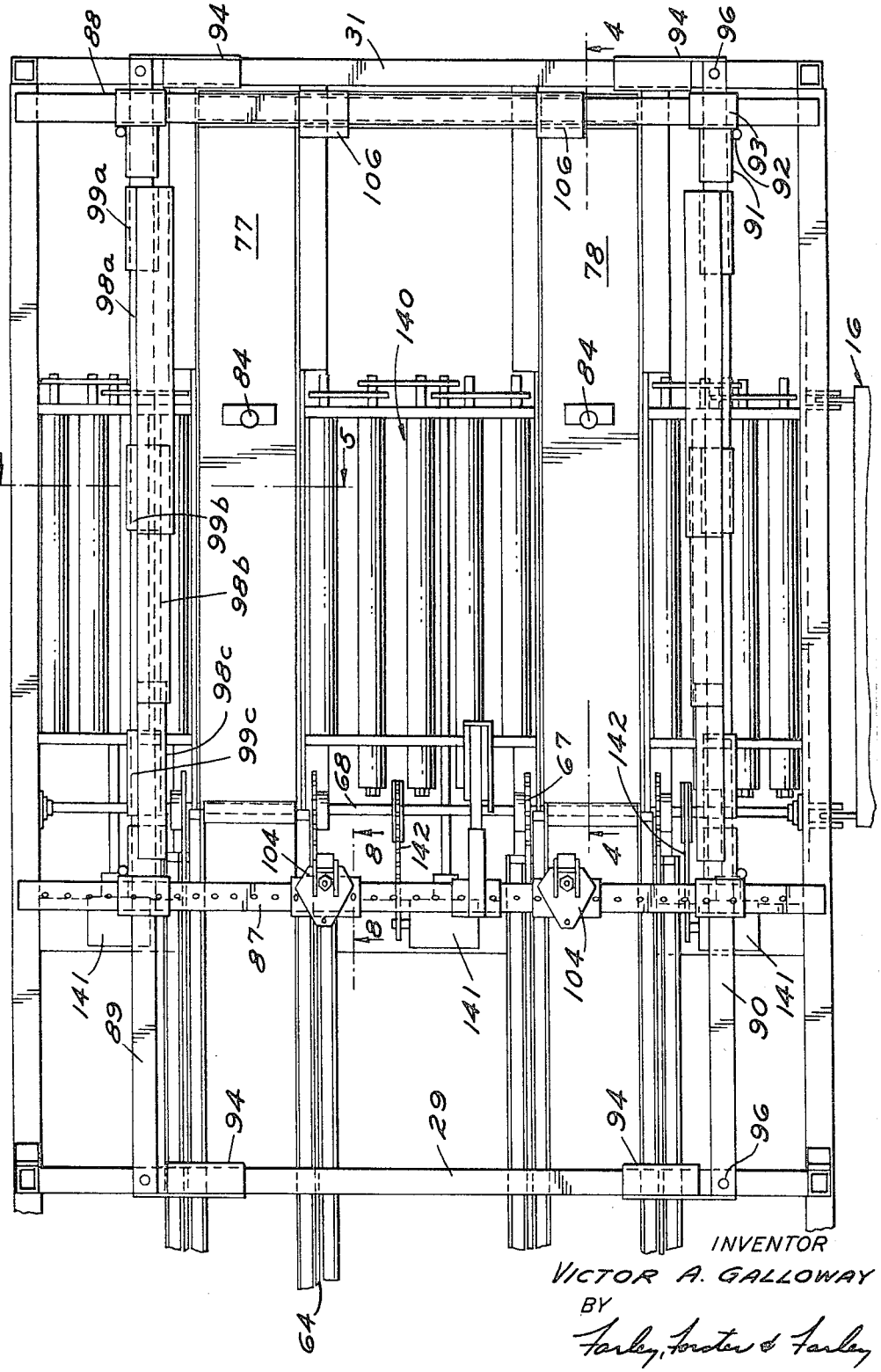

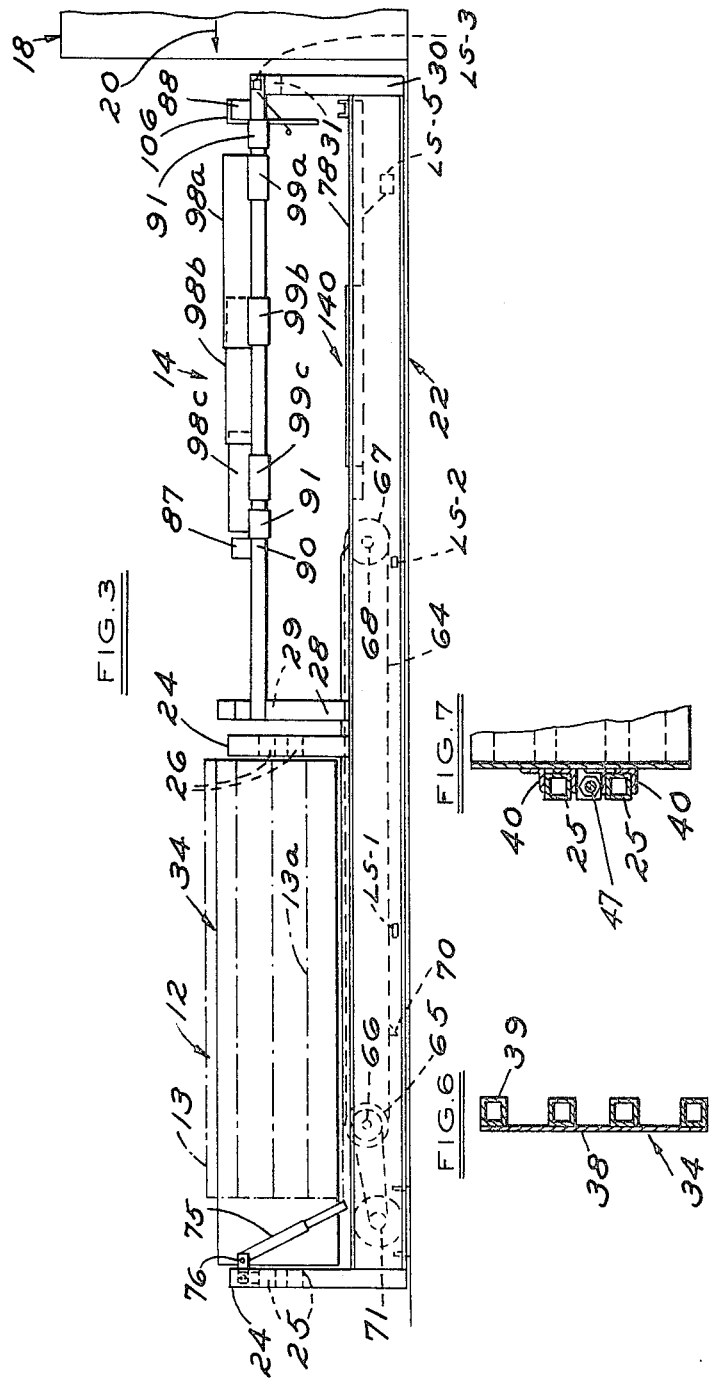

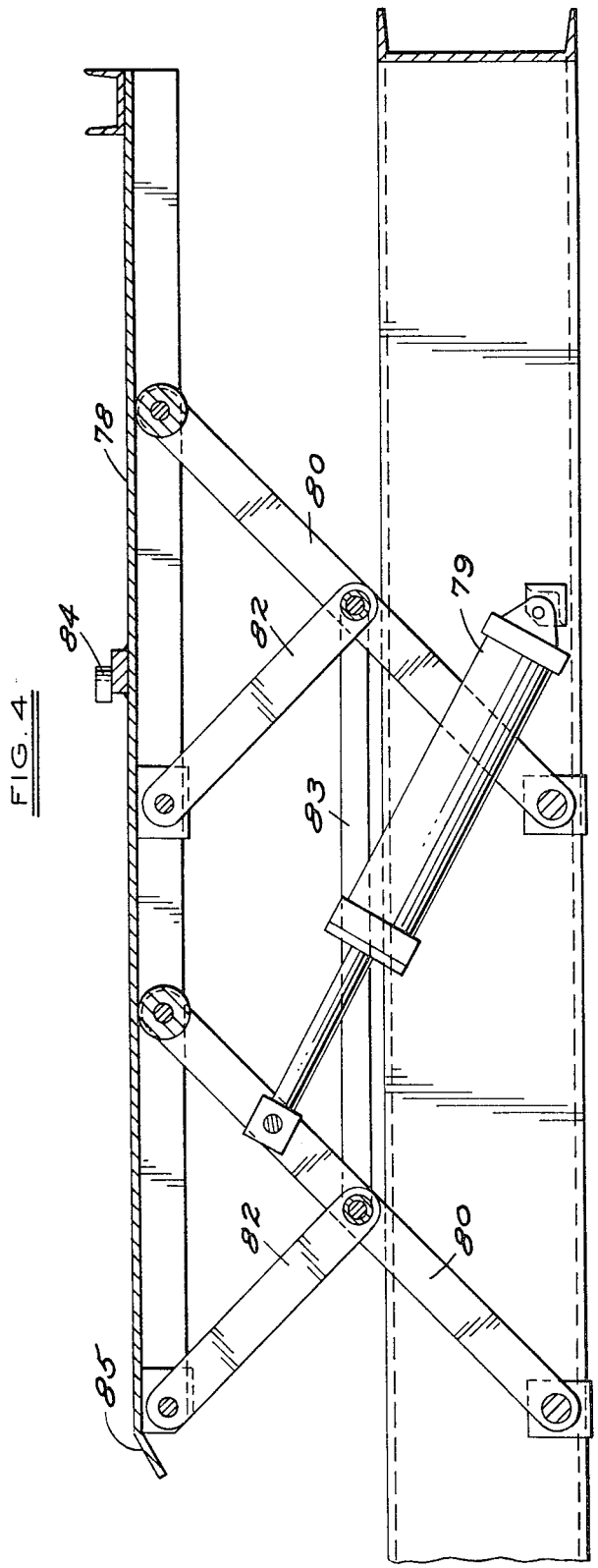

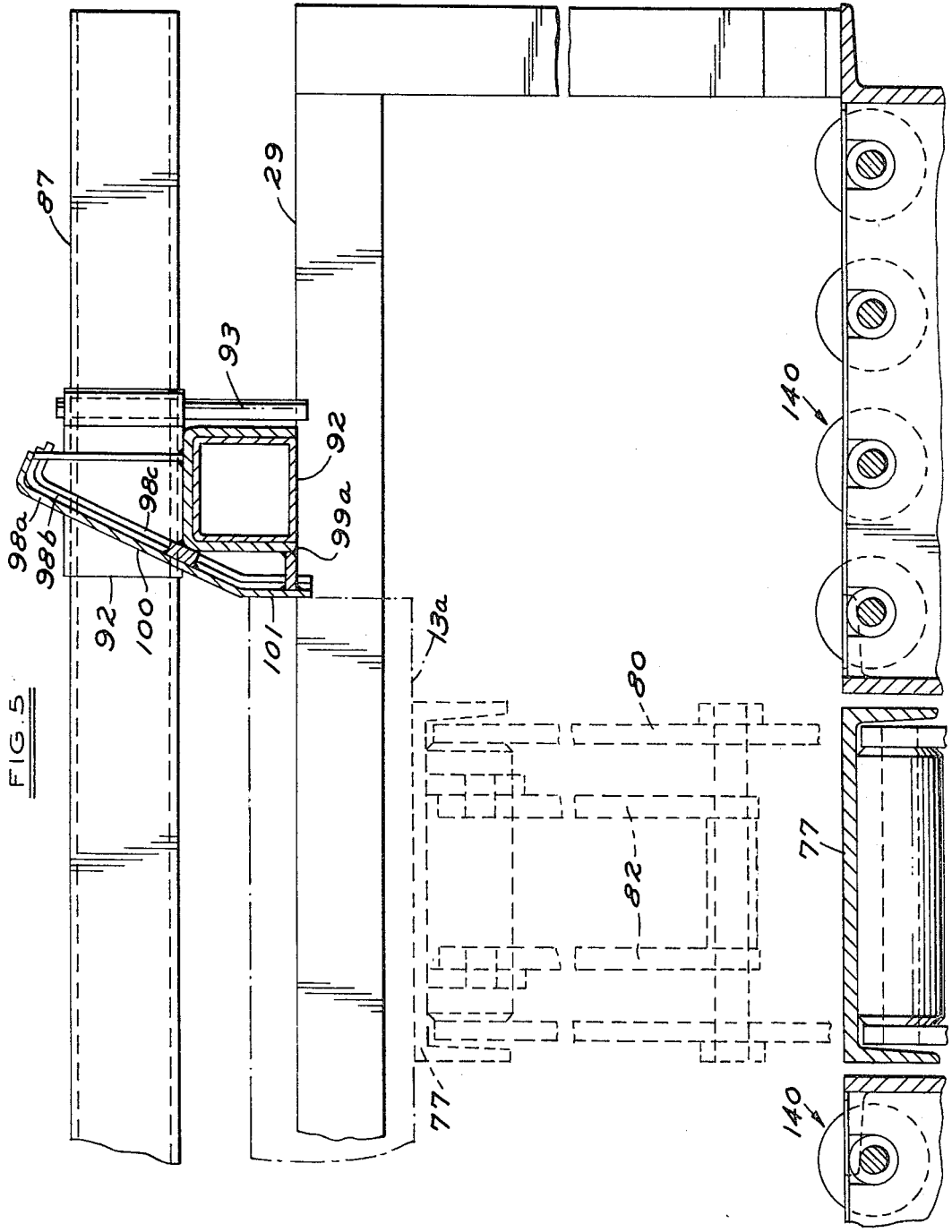

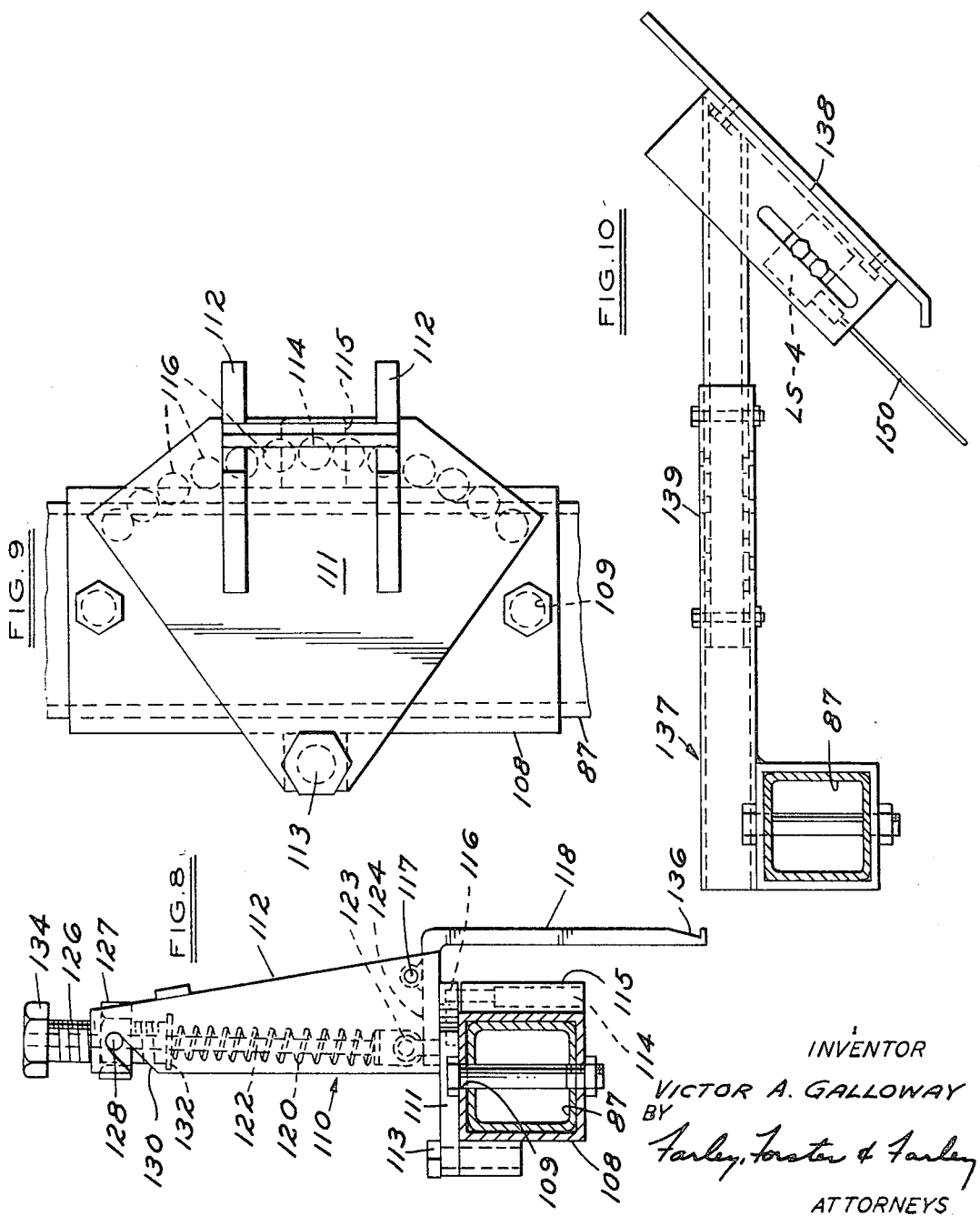

3,433,372
SHEET MATERIAL PALLETIZING APPARATUS
Victor A. Galloway, Grosse Pointe Woods, Mich., assignor to Equipment Manufacturing, Inc., a corporation of Delaware
Filed June 13, 1966, Ser. No. 557,295
U.S. Cl. 214—6                                   15 Claims
Int. Cl. B65g 57/03, 59/02

ABSTRACT OF THE DISCLOSURE

Apparatus having a storage station for a bank of empty pallets and a stack forming station where an empty pallet is raised into a loading area defined by guide members, to which loading area sheet metal blanks are delivered and stacked on the pallet, the pallet being lowered as the stack builds up. The guide members are relatively positionable to receive blanks of different sizes and shapes and cushioning devices are mounted on the guide members to absorb forward and reverse motion of a blank being delivered. Transfer of an empty pallet to the stack forming station from the storage station is accomplished by stripping the lowermost pallet of a bank out from beneath other pallets supported thereon after the lowermost pallet has been engaged and located in proper position for transfer.

---

The subject of this invention is an improved apparatus for use with a machine such as a blanking press, for receiving sheet metal blanks in succession as delivered from the press, loading a desired number of blanks onto an empty pallet in a uniform stack, removing the loaded pallet, and replacing it with another empty pallet from a bank of pallets held in readiness at a storage station of the apparatus.

It is customary in stamping operatings to employ one blanking press to produce blanks for a number of different parts with the result that the blanks delivered from the press will vary in size and configuration from time to time as the dies in the press are changed from one part to another. It has been conventional practice to load the blanks delivered from the blanking press onto pallets for transfer to the stamping operation, with different size pallets being used according to the size of the different blanks. This loading operation has heretofore been largely a manual one, the blanks being loaded on a pallet in rather haphazard fashion, resulting in high labor costs and relatively high scrap losses due to blanks being damaged in the transfer process.

The present invention provides apparatus for use with a machine such as a blanking press to receive and stack sheet metal blanks of various sizes and shapes formed in the press on pallets of various sizes, including structure providing a station for storing a bank of pallets in superimposed relation and further providing a stack forming station having an elevator for raising an empty pallet and progressively lowering the same as sheet metal blanks are successively loaded thereon to build up a stack; feeding means for transferring a pallet from the storing station to a certain position relative to a line of reference at the stack forming station; adjustable positioning means for engaging the pallet being transferred to center it tranversely of the direction of transferring movement relative to a second line of reference normal to the first line of reference; guide means mounted above the stack forming station in adjustable relation to the first and second lines of reference for engaging and directing sheet metal blanks into a loading area; and means for maintaining the receiving surface of the pallet and its load at a level within the loading area as a stack of sheet metal blanks is built up on the pallet.

This apparatus of the invention is capable of handling pallets of different size and sheet metal blanks of different size and configuration. When the dies in the blanking press are changed and the next blanks to be run require a pallet of a different size, the adjustable positioning means at the pallet storing station of the appartus are reset for the new size pallet so that each new size pallet will be properly positioned relative to the second line of reference; likewise the guide means at the stack forming station are also reset to conform to the size and configuration of the new blank to be handled and to direct blanks being received into the loading area, the position of which is also established relative to the first and second lines of reference. These operations on the apparatus are performed while the dies are being changed in the blanking press and suitable controls are incorporated in the apparatus so that the blanking press is operated only when a pallet is in position to receive the blanks being delivered to the apparatus.

Other features and advantages of the invention will more fully appear from the following description of the representative embodiment shown in the accompanying drawings in which FIGURE 1 is a plan view of the apparatus;

FIGURE 2A is a plan view on an enlarged scale of the pallet storing station of the apparatus;

FIGURE 2B is a plan view similar to FIG. 2A but showing the stack forming station of the apparatus;

FIGURE 3 is a side elevation of the apparatus as shown in FIG. 1;

FIGURE 4 is an enlarged sectional elevation of the elevator mechanism taken as indicated by the line 4—4 of FIG. 2B;

FIGURE 5 is an enlarged sectional elevation of the elevator and guide means taken as indicated by the line 5—5 of FIG. 2B;

FIGURE 6 is an elevation taken as indicated by the line 6—6 of FIG. 2A;

FIGURE 7 is a sectional detail taken as indicated by the line 7—7 of FIG. 2A;

FIGURE 8 is an enlarged elevation of a cushioning device taken on the line 8—8 of FIG. 2B;

FIGURE 9 is an enlarged plan view of the device shown in FIG. 8; and

FIGURE 10 is an enlarged sectional elevation of the stack height-sensing element.

Referring to FIGS. 1 and 3, the structure forming the left portion of the apparatus illustrated therein provides a pallet storage station 12 for a bank of superimposed pallets 13, the right hand portion of the structure provides a stack forming station 14 to which the lowermost pallet in the bank is transferred for loading, and a section of roller conveyor extending from the stack forming station 14 forms a station 16 to which a loaded pallet is delivered. The apparatus is positioned with the stack forming station 14 adjacent the bed 18 of a blanking press which feeds blanks to the appartus as indicated by the arrow 20.

This structure of the apparatus includes a suitable base frame 22, and at the storage station 12 a three-sided upright framework is formed by four corner posts 24 interconnected by transverse tubular members 25 and 26 and longitudinal members 27. At the stack forming station 14 there is provided an upright framework consisting of a pair of corner posts 28 interconnected by a cross-member 29 and a second pair of corner posts 30 interconnected by a cross-member 31.

The major components of the apparatus are mounted on this structure and include pallet positioning means at the storage station 12, transfer means for moving a pallet from the storage station to the stack forming station, an elevator at the stack forming station, adjustable guide means at the stack forming station, and a conveyor for moving a loaded pallet from the stack forming station 14 to the delivery station 16. These components will now be described in further detail.

*Pallet positioning means—FIGS. 1, 2A, 6 and 7*

The pallet positioning means essentially comprises the combination of an adjustable backstop 34 and a pusher bar 36. The backstop is formed by a plate 38 secured to a number of parallel tubular bars 39 as shown in FIG. 6, and slidably mounted between the transverse frame members 25 and 26 by end brackets 40. Movement of the backstop 34 on the frame members 25 and 26 is accomplished by a pair of feed screws 41 and 42 which can be rotated in unison by a drive unit 44 and a sprocket and chain connection 46. A threaded connection 47 is employed between each feed screw and one of the end brackets 40 of the backstop.

The pusher bar 36 is pivotally connected at 48 and 49 to a pair of links 50 and 51 each provided with a roller 52 at its other end which engages a guide 53 on the frame side member 54. The pusher bar is movable toward and away from the backstop 34 by an air cylinder 56 which actuates a pair of triangular bell cranks 57 and 58 interconnected by a cross link 59. Each of the cranks 57 and 58 is connected to the frame member 54 by a pivot 60 and to one of the pusher bar links 50 and 51 by a pivot 62. This pusher bar actuating mechanism produces movement of the pusher bar 36 toward and away from the backstop 34 in substantial parallelism therewith on a stroke which is amplified by the bell crank and roller linkage and which is variable in length due to the cushioning effect of the air cylinder 56.

*Pallet transfer means—FIGS. 1, 2A and 3*

A series of transfer chains 64 are each trained about a sprocket 65 on a head shaft 66 and a sprocket 67 on a tail shaft 68 and are located below the pallet supporting surface 69. Each chain is equipped with a pallet pusher 70 with all pushers being mounted in transverse alignment. The head shaft 66 is driven by a motor and twin gear box unit 71 through spaced drive sprockets 72 and 73 to reduce shaft twist and maintain the pushers in transverse alignment. As the pushers enter the upper or driving run of the chains they are projected through slots 74 in the pallet supporting surface to engage a stringer of the lowermost pallet 13a in a bank of pallets at the pallet storage station and strip this pallet 13a from the bank. Movement of other pallets in the bank resulting from the withdrawal of the support of the lowermost pallet is restricted in the direction of forwarding movement of the pushers by the transverse frame members 26 (FIG. 3) under which only the lowermost pallet can pass. Such resulting movement of other pallets is restricted in the opposite direction by the frame members 25 or by guides 75 of adjustable length, each of which is pivoted to a hinge strap 76 carried by the upper one of the frame members 25 and extends down to the pallet supporting surface 69. The length of the guides 75 is adjusted according to the size of pallet being handled; for the largest sizes, the guides 75 are swung out of the pallet storage station.

Since each lowermost pallet is accurately located relative to the transfer means, prior to engagement by the pushers 70, there is no need to attempt to maintain accurate positioning of the bank of pallets.

*Elevator—FIGS. 2B, 4 and 5*

As shown in FIG. 2B, the elevator consists of a pair of platforms 77 and 78, each constructed as shown in FIGS. 4 and 5 and connected to the frame structure by a parallelogram type linkage operated by a fluid pressure cylinder 79. This linkage includes pairs of main links 80 pivotally connected to the base frame and elevator platform, pairs of stabilizing links 82 connected between the main links and elevator platform, and a cross link 83 connected between the main links 70. Each of the platforms 77 and 78 may be provided with an abutment or stop 84 to limit movement of a pallet advanced onto the platforms by the pushers 70 of the transfer chains. The entrance end 85 of the elevator platforms is located in approximate vertical alignment with the shaft 68, as shown in FIG. 2B, and hence as a pallet is advanced onto the elevator platforms by the transfer chains the pallet is fully positioned thereon as the pushers 70 of the chains disengage from the pallet stringer. This normally establishes the pallet position on the elevators and the stops 84 are used more as a safety device than a positioning device.

Vertical movement of the elevator platforms is between a lower position shown in full line in FIG. 5 and an upper position indicated in broken line.

*Guide means—FIGS. 1, 2B, 3 and 5*

The guide means consists of a pair of end guide members 87 and 88 which extend generally transversely to the path of travel of a sheet metal blank being received at the stack forming station of the apparatus, and a pair of side guides 89 and 90 which extend in the direction of blank movement, the end guide members being mounted in brackets (FIG. 2B) each of which includes a portion 91 slidably mounted on one of the side guides and a collar 92 slidably receiving the end guide and connected to the portion 91 by a pivot 93. Each of the side guides 89 and 90 is supported between the upper transverse frame members 29 and 31 on brackets 94 of inverted U-shape which slidably engage the frame members. Each of the brackets 94 is secured to an end of one of the side guides by a pivotal connection 96 to permit greater flexibility in adjusting the position of the side guide to conform to the edges of a blank being received. Each side guide is also provided with a suitable number of nested guide plates 98a, 98b, and 98c, each mounted on an inverted U-shaped supporting bracket 99a, 99b, and 99c, respectively, which slidably engages one of the guide members 89 and 90 as shown by the bracket 99a in FIG. 5. These guide plates form the effective guiding portion of the side guides which portion is adjustable in length by telescoping the guide plates. As shown in FIG. 5 the guide plates each include a downwardly inclined portion 100 and a lower vertical portion 101, this latter portion defining the sides of a loading area into which sheet metal blanks received by the apparatus are directed by the guide means.

Suitable cushionining devices 104 are adjustably mounted on the end guide member 87 in the path of travel of the leading edge of a sheet metal blank being received for engagement thereby. These cushioning devices act to absorb the impact of and impart a rebounding motion to the sheet metal blank which in turn is arrested by backstop members 106 adjustably mounted on the other end guide member 88. Hence the cushioning devices 104 and backstop members 106 act to define the end edges of the loading area into which a sheet metal blank being received by the apparatus is directed by the guide means.

Each cushioning device 104, as best shown in FIGS. 2B, 8 and 9, includes a collar 108 slidably engaging the guide tube 87, and provided with holes 109 for suitable fastening devices engageable with holes in the tube 87 to anchor the cushioning device in a desired position. A bracket 110 consisting of a base plate 111 and a pair of upstanding members 112, is pivotally secured to the collar 108 by a bolt 113 and is anchored in a desired pivotal position by a bolt 114 mounted in a boss 115 on the collar and engaging one of a series of sockets 116 in the base plate 111. An L-shaped kicker arm 118 is pivoted between the upstanding plates 112 on a pin 117, and is normally urged to the full line position shown in FIG. 8 by a compression spring 120. This spring 120 is mounted on a guide rod 122 pivoted to an 123 secured the portion 124 of the arm 118 and slidably engaging a threaded sleeve 126 carried by a nut 127 which is provided with a pair of projecting pins 128 to fit in notches 130 in the upstanding bracket members 112. The spring 120 is mounted between the portion 124 of the arm 118 and a thrust washer 132 abutting the sleeve 126, which may be turned by a nut 134 secured to the outer end thereof to regulate the compression loading of the spring 120.

The depending, resiliently mounted arm 118 of a cushioning device is engaged by the leading edge of a blank coming from the press, and is provided with a notch 136 near its lower edge to minimize the possibility of a blank slipping by. Each cushioning device is adjusted about the pivot 113 so that the face of the arm 118 lies substantially parallel to the edge of the blank to be engaged, and offers a relatively great area vertically to provide for variations in the elevation at which impact may occur. With variations in the number of cushioning devices employed, their relative positioning on the transverse guide member 87, and the loading of the spring 120 of each device, adequate shock absorbing can be provided for a wide range of blank sizes, weights and configurations.

*Discharge conveyors—FIGS. 1, 2B and 5*

The stack forming station is equipped with a live roller conveyor bed 140 consisting of three groups of rollers mounted between and alongside of the elevator platforms 77 and 78 with each group of rollers being driven through a gear box 141 and a sprocket and chain connection 142 to the shaft 68. These live rollers advance a loaded pallet deposited thereon by the elevator means onto a gravity roller conveyor sectoin 144 (FIG. 1).

*Operation—FIGS. 1 and 3*

In setting up the apparatus for a run of the press to produce blanks of a certain size and configuration which are to be loaded on pallets of a given size, the position of the backstop 34 is adjusted in accordance with the size of the pallets to be employed to locate the pallet relative to a reference line extending parallel to the transfer chains 64. Preferably the backstop 34 is positioned at a slight angle of divergence to the transfer chains as this will reduce frictional engagement between a pallet being transferred and the backstop when the pallet is engaged by and centered on the transversely aligned pushers 70.

The guide and cushioning means are also adjusted in accordance with the size and configuration of the blank to be formed and positioned so that the loading area to which a blank being received is directed by these means is centered on, or properly located relative to the aforementioned line of reference and also relative to a second line of reference normal thereto, established by the position to which the pallet is advanced when the pushers 70 of the transfer chains disengage from the pallet in passing around the sprockets 67 on the tail shaft 68.

After these adjustments have been made, a plurality of superimposed pallets are loaded into the storage station 12 by a fork truck and the apparatus is ready to work. Functioning of the apparatus is regulated by suitable controls which have not been shown in detail as they merely consist of suitable sensing elements, such as limit switches, and conventional circuitry enabling these sensing elements to cause the apparatus to function in a cycle which includes the following operations in the sequence named:

(1) The drive unit 71 is started to drive the transfer chains 64 and their pallet pushers 70 and to power the live roller conveyor bed 140, the apparatus having been stopped on the previous cycle with the pallet pushers 70 at the beginning of the lower or return run of the transfer chains adjacent the sprockets 67 on the tail shaft 68, and with the elevator platforms 77 and 78 in their full lowered position below the level of the roller conveyor bed 140.

(2) As the pallet pushers begin their return run a sensing element LS–1 is contacted by one of the pushers 70 causing the following operations to take place:

(a) the air cylinder 56 is actuated moving the pusher bar 36 into engagement with the lowermost pallet 13a in the bank and pushing it against the backstop 34;

(b) the elevator cylinders 79 are actuated to move the elevator platforms 77 and 78 upwardly to the level of the pallet supporting surface 69 which is above the level of the roller conveyor bed 140.

The pusher bar 36 may be retracted by a control element responsive to pressure in the air cylinder 56 or responsive to contact between the lowermost pallet and the backstop 34, as desired.

(3) The pushers 70 enter their upper or driving run and engage a stringer of the lowermost pallet 13a, stripping this pallet out from under all other pallets in the bank which are restrained by the fence formed by the transverse frame members 26, and the lowermost pallet is advanced or transferred from the storing station to the stack forming station where it is positioned on the elevator platforms 77 and 78 as the pushers 70 disengage from the pallet in passing around the sprockets 67 on the tail shaft 68.

(4) A control element, LS–2 is then contacted by one of the pushers 70 and causes the drive unit 71 to be stopped and fluid to be supplied to the elevator cylinders 79 to raise the elevator platforms.

(5) Upward elevator movement is stopped by a limit switch LS–3 (FIG. 3) which may be mounted on the fixed cross member 31 of the frame at the stack forming station, and preferably this same limit switch is employed to start the blanking press in operation. This control element LS–3 is mounted so that the upper surface of the pallet lies in the loading area defined by the guide means.

(6) As blanks delivered to the apparatus from the press build up on the pallet, the elevator is lowered incrementally by a control element LS–4 which is adjustably mounted on a bracket 137 (FIGS. 2B and 10) carried by the guide member 87 and consisting of a switch mounting member 138 secured at an acute angle to a variable length bracket arm 139. The control element LS–4 senses the upper and lower level of the receiving surface within limits defined by the amount of vertical movement of the probe 150 required to actuate the control element.

(7) When the desired number of blanks have been deposited in a stack on the pallet, as determined for example by a counter type of control element, this control element shuts off the press and initiates lowering movement of the elevator platforms 77 and 78.

(8) A control element LS–5 is contacted by the elevators in their full down positon and shuts the apparatus off.

The foregoing cycle of operation may be repeated by manual or automatic control. As each new cycle begins the pallet loaded during the previous cycle is moved out of the stack forming station by operation of the roller conveyor bed 140 onto the gravity roller convyer 144 of the delivery station 16.

While preferred embodiments have been described above in detail, it will be understood that numerous modi-

I claim:

1. Apparatus for use with a machine such as a blanking press to receive and stack sheet metal blanks of various sizes and shapes formed therein on pallets of various sizes, including structure providing a storing station having means for supporting a bank of superimposed pallets on the lowermost pallet of the bank and a stack forming station having an elevator for raising an empty pallet and progressively lowering the same as sheet metal blanks are successively loaded thereon to build up a stack, transfer means adapted to engage and strip the lowermost pallet of the bank from beneath any remaining pallets supported thereon by moving such lowermost pallet from the storing station to a certain position at the stack forming station, adjustable positioning means for engaging the lowermost pallet being transferred to center it transversely of the direction of transferring movement while the remainder of the stack is supported thereon, guide means mounted above the stack forming station in adjustable relation to the said position of a transferred pallet for engaging and directing sheet metal blanks into a loading area defined by the guide means, and means for maintaining the receiving surface of the pallet and its load at a level within the loading area as a stack of sheet metal blanks is built up on the pallet.

2. Apparatus as claimed in claim 1 wherein the positioning means comprises a backstop member at the pallet storing station engageable by at least the lowermost pallet of the bank of pallets, means adjustably positioning the backstop member in a direction transverse to the direction of transferring movement of the transfer means, a pallet pushing device for engaging the lowermost pallet, means for moving the pushing device toward and away from the backstop member whereby each lowermost pallet will be positioned in engagement therewith, and means for actuating the pallet pushing device prior to engagement of the lowermost pallet by the transfer means.

3. Apparatus as claimed in claim 1 wherein the guide means comprises a pair of side guide members adjustable in length, means individually mounting each of the side guide members for adjustment relative to the said position of a tranferred pallet; a pair of end guide members, and means adjustably mounting each of the end guide members for adjusting movement longitudinally of the side guide members.

4. Apparatus as claimed in claim 1 wherein the guide means includes a pair of end guide members extending generally transversely to the path of travel of a sheet metal blank being received by the apparatus and a pair of side guide members, means mounting the end and side guide members in adjustable spaced relation, cushioning means carried by one of the end guide members for engagement by the leading edge of a sheet metal blank being received by the apparatus, and backstop means carried by the other end guide member whereby a sheet metal blank being received by the apparatus will have impact absorbing engagement with the cushioning means on the one end guide member and will tend to rebound into engagement with the backstop means on the other end guide member for accurate positioning of the sheet metal blank in the loading area.

5. Apparatus as claimed in claim 1 wherein the supporting means of the storing station provides a lowermost pallet supporting surface, the transfer means comprising a plurality of endless chains travelling below said surface and provided with driving elements extensible above the surface for engaging the lowermost pallet resting thereon, the positioning means including a backstop mounted for adjustable positioning in a direction transverse to the direction of travel of the chains, and a pallet pushing device for engaging and positioning the lowermost pallet against the backstop prior to the engagement of such pallet by the driving elements.

6. Apparatus as claimed in claim 4 wherein the cushioning means includes at least one device consisting of a bracket, a kicker arm pivotally mounted thereon and having a portion extending generally vertically for engagement by the leading edge of a blank, and means resiliently opposing pivotal movement of the kicker arm resulting from such engagement.

7. Apparatus as claimed in claim 4 wherein the cushioning means includes at least one device consisting of a resiliently supported member engageable by the leading edge of a blank and means mounting said member for adjustable positioning transversely and angularly relative to the leading edge of a blank.

8. Apparatus as claimed in claim 1 wherein the means for maintaining the receiving surface of the pallet and its load at a level within the loading area includes a control element and means mounting said element for sensing an upper and lower level of said receiving surface as a stack of sheet metal blanks is progressively built up on the pallet.

9. Apparatus as claimed in claim 8 wherein the means mounting the control element comprises a bracket having a variable length arm, means for securing one end of the arm to the structure of the apparatus, and means mounting the control element on the other end of the arm for adjustment on a line extending at an acute angle to the arm.

10. Apparatus as claimed in claim 2 further including means for restricting movement of other pallets in the bank as the lowermost pallet is stripped from the bank by the transfer means.

11. In apparatus for loading material on pallets including structure forming a station for supporting and storing a plurality of superimposed pallets in a bank, and an adjacent station at which pallets are loaded with material, the improvement comprising the combination of a backstop member mounted at the pallet storing station, a pallet pushing device, means for moving the pushing device toward and away from the backstop member to position the lowermost pallet in the bank against the backstop member, a pallet stripping and transfer conveyor mounted for movement in a direction generally parallel to the backstop member and provided with means for positively engaging and propelling the lowermost pallet out from beneath any remaining pallets in the bank supported thereon, and means for actuating the pushing device to position the lowermost pallet prior to the engagement thereof by the stripping and transfer conveyor.

12. Apparatus as claimed in claim 11 wherein the structure forming the pallet storing station includes a pair of end frames mounted in parallel spaced relation transversely to the direction of forwarding movement of the pallet stripping and transfer conveyor, means mounting the backstop member between the end frames for adjustable positioning movement longitudinally thereof, one of the end frames being constructed to form a fence to restrain movement in a forwarding direction of all pallets but the lowermost pallet being stripped from the bank.

13. Apparatus as claimed in claim 12 further including means mounted on the other of the end frames for restricting movement in the direction opposite to the forwarding direction of all pallets but the lowermost pallet.

14. Apparatus as claimed in claim 11 further including means for adjustably positioning the backstop member in a direction normal to the direction of transferring movement of the transfer means.

15. Apparatus as claimed in claim 14 wherein the means for moving the backstop comprises a pair of adjusting screws, means for rotating the adjusting screws, and means for connecting the backstop to each of the adjusting screws for movement longitudinally thereof upon rotation of the screws.

(References on following page)

References Cited

UNITED STATES PATENTS

| | | |
|---|---|---|
| 2,508,861 | 5/1950 | Jessen. |
| 3,178,053 | 4/1965 | Robinson. |
| 2,185,675 | 1/1940 | Mitchell et al. _____ 214—8.5 X |
| 2,456,004 | 12/1948 | Larkin _____ 214—6 |
| 2,585,076 | 2/1952 | Bandura et al. _____ 214—6 |
| 2,606,669 | 8/1952 | Morrison _____ 214—6 |
| 2,832,480 | 4/1958 | Barski _____ 214—6 |
| 2,883,074 | 4/1959 | Boehl et al. _____ 214—6 |
| 2,942,717 | 6/1960 | Raynor _____ 214—6 X |
| 2,970,591 | 2/1961 | Paulsen _____ 214—8.5 X |
| 3,122,242 | 2/1964 | Lopez et al. _____ 214—6 |
| 3,306,475 | 2/1967 | Mays _____ 214—6 |
| 3,338,430 | 8/1967 | Roberts et al. _____ 214—6 |

GERALD M. FORLENZA, *Primary Examiner.*

ROBERT J. SPAR, *Assistant Examiner.*

U.S. Cl. X.R.

214—8.5; 221—204